US012759228B2

(12) United States Patent
Dorini

(10) Patent No.: US 12,759,228 B2
(45) **Date of Patent: *Oct. 13, 2026**

(54) METHOD FOR DETERMINING A SET POINT FOR A THERMAL SENSOR IN AN APPARATUS FOR THE MANUFACTURE OF 3D OBJECTS

(71) Applicant: Stratasys Powder Production Ltd., Nottingham (GB)

(72) Inventor: Gianluca Dorini, London (GB)

(73) Assignee: Stratasys Powder Production Ltd., Nottingham (GB)

( * ) Notice: Subject to any disclaimer, the term of this patent is extended or adjusted under 35 U.S.C. 154(b) by 655 days.

This patent is subject to a terminal disclaimer.

(21) Appl. No.: 17/943,438

(22) Filed: Sep. 13, 2022

(65) Prior Publication Data

US 2023/0079989 A1 Mar. 16, 2023

(30) Foreign Application Priority Data

Sep. 13, 2021 (GB) ..................................... 2113003

(51) Int. Cl.
*B29C 64/165* (2017.01)
*B29C 64/209* (2017.01)
(Continued)

(52) U.S. Cl.
CPC .......... *B29C 64/165* (2017.08); *B29C 64/209* (2017.08); *B29C 64/282* (2017.08); *B29C 64/314* (2017.08); *B29C 64/393* (2017.08); *B33Y 10/00* (2014.12); *B33Y 40/10* (2020.01); *B33Y 50/02* (2014.12)

(58) Field of Classification Search
None
See application file for complete search history.

(56) References Cited

U.S. PATENT DOCUMENTS

2017/0297265 A1* 10/2017 Martinez Fornos .... B29C 64/10
2018/0186074 A1* 7/2018 Hull ....................... B33Y 30/00
(Continued)

FOREIGN PATENT DOCUMENTS

WO 2016/050322 A1 4/2016
WO WO 2017200533 * 5/2016 ............ B29C 67/00
(Continued)

*Primary Examiner* — Farah Taufiq
(74) *Attorney, Agent, or Firm* — HONIGMAN LLP; Eric J. Sosenko; Jonathan P. O'Brien

(57) ABSTRACT

A method for determining a set point for a thermal sensor. The method includes (a) distributing a layer of particulate material to provide a build bed surface; (b) depositing an amount of absorption modifier over a test region or a surrounding area; (c) heating the test region; (d) measuring a temperature value within the test region with the sensor; (e) distributing a new layer of material over the preceding layer; repeating (b) to (e) until the material of the test region starts to melt, wherein repeated step (b) deposits additional absorption modifier over the test region to absorb more energy from the heat source than the preceding layer; determining a set point for the thermal sensor from a characteristic in the evolution of the measured temperature value within the test region; and applying the set point to subsequent measurements of the thermal sensor.

12 Claims, 4 Drawing Sheets

(51) Int. Cl.

| | |
|---|---|
| ***B29C 64/282*** | (2017.01) |
| ***B29C 64/314*** | (2017.01) |
| ***B29C 64/393*** | (2017.01) |
| ***B33Y 10/00*** | (2015.01) |
| ***B33Y 40/10*** | (2020.01) |
| ***B33Y 50/02*** | (2015.01) |

(56) References Cited

U.S. PATENT DOCUMENTS

2020/0398482 A1* 12/2020 Tjellesen .............. B29C 64/209
2021/0362429 A1* 11/2021 Barnes ................... B33Y 10/00
2021/0387419 A1* 12/2021 Patel ...................... B33Y 10/00
2022/0266345 A1* 8/2022 Rossi ...................... B22F 12/57

FOREIGN PATENT DOCUMENTS

WO 2019/143347 A1 7/2019
WO 2021/214465 A1 10/2021

* cited by examiner

METHOD FOR DETERMINING A SET POINT FOR A THERMAL SENSOR IN AN APPARATUS FOR THE MANUFACTURE OF 3D OBJECTS

FIELD OF THE INVENTION

The present disclosure relates to a method for calibrating a thermal sensor with respect to a thermal characteristic, such as the melting point, of a particulate build material when it is applied layer-by-layer and processed into slices of consolidated build material to form a three-dimensional (3D) object. The method might find particular benefit in a powder bed fusion apparatus in which 3D objects are built layer-by-layer from particulate material. A controller and an apparatus for applying the method are also disclosed.

BACKGROUND

In applications for forming 3D objects from particulate material, such as powder bed fusion applications like "print and sinter" and laser sintering, an object is formed layer-by-layer from particulate material spread in successive layers across a support. Each successive layer of the object is melted, or partially melted, to fuse or sinter the particulate material over defined regions and, in so doing, to consolidate it, in order to form a cross section of the 3D object. In the context of particulate polymer materials for example, the process of melting achieves fusion of particles. Such a process requires accurate temperature control over the temperature of the surface that is being processed to achieve high-quality, uniform objects with well-defined properties. Accurate temperature control requires use of a thermal sensor, such as a pyrometer or thermal camera, which detects the temperature of the surface (the build bed surface). Detection may be continuous or intermittent during each layer cycle and is used to apply feedback control to the various heat sources used during a build process, for example to the zonal overhead heater that may be arranged to maintain the build bed surface at a predefined target temperature, below the melting point of the particulate material. For reliable process control from build to build, or between different apparatus, it is known to relate the sensor readings to a reproducible thermal event for a given material, for example to a phase change. This might be the phase change from solid to liquid (i.e. melting or fusion of the particulate material). Different materials may have different melting points; similarly, the same material, treated or aged differently, may display a shift in melting point. In "print and sinter" processes for example, often some of the powder is recycled and reused and the powder properties are liable to change as a result of thermal cycling, potentially causing a shift in the melting conditions and necessitating an adjustment in thermal control. It is therefore important to be able to determine a reliable set point for the temperature readings of the thermal sensor.

It has been found that known correction processes, that assess thermal camera measurements for a characteristic change in the temperature curve during which the particulate material is heated to identify a thermal characteristic, often do not provide the expected optimal thermal control conditions for a subsequent build process of a 3D object. This is exacerbated when control across a fleet of printers, which can in addition be located in different environments, is necessary, for example for process transfer and support. Despite applying a calibration routine for the thermal sensor, subsequent build processes appear to perform unsatisfactorily with respect to thermal control of the layers, which leads to uncontrollable variation in build quality. An improved calibration process is therefore needed that provides a set point for the temperature readings of a thermal sensor that is relevant to the subsequent build process of a 3D object.

SUMMARY

The following disclosure describes, in one aspect, a method for determining a set point for a thermal sensor in an apparatus for the layer-by-layer manufacture of a three-dimensional object from particulate material; the method comprising:

(a) distributing a layer of particulate material, the layer providing a build bed surface;

(b) depositing an amount of absorption modifier over at least one of the test region and a surrounding area surrounding the test region;

(c) heating the test region over a period of time with a heat source;

(d) measuring with the thermal sensor a temperature value TR within the test region;

(e) distributing a further layer of material over the preceding layer of material, the new layer providing the build bed surface;

repeating steps (b) to (g) of the layer cycle at least until the test region starts to melt, wherein step (b) comprises depositing a further amount of absorption modifier over the test region, wherein the further amount of absorption modifier causes the particulate material of the test region to absorb more energy from the heat source than the test region of the preceding layer;

determining a set point for the thermal sensor from a characteristic of the material as identified from a characteristic in the evolution of the measured temperature value TR within the test region; and applying the determined set point to subsequent measurements of the thermal sensor.

BRIEF DESCRIPTION OF THE DRAWINGS

Reference is now directed to the drawings, in which.

In the drawings, like elements are indicated by like reference numerals throughout.

DETAILED DESCRIPTION

An improved method for the determination of a set point of a thermal sensor such as a thermal camera in a 3D printing apparatus, an associated apparatus and controller therefor, and a resulting test part, will now be described with reference to FIGS. 1A to 5.

Figure 1A:
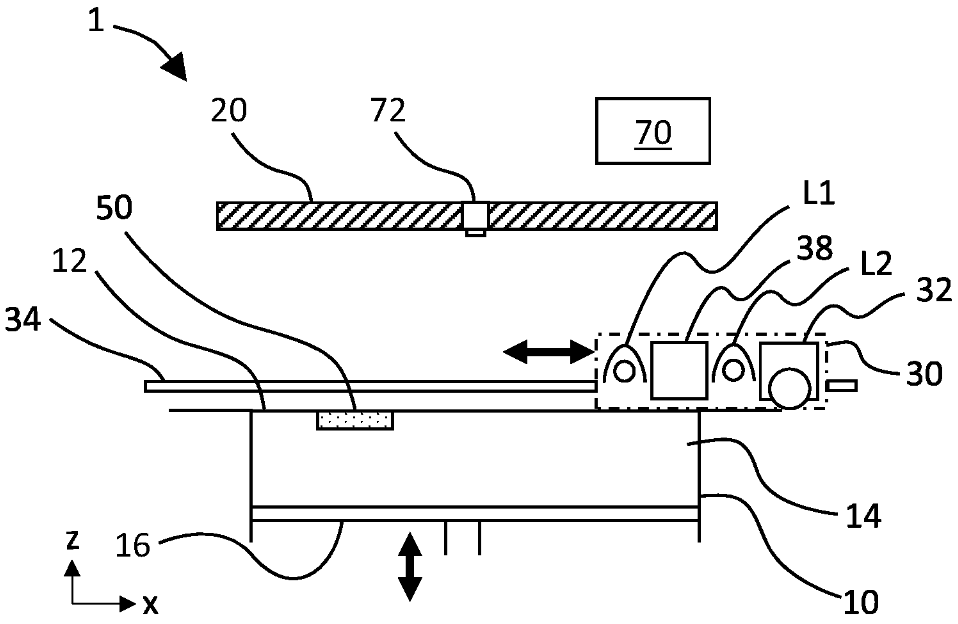
FIG. 1A is a schematic cross-section of detail of a side view of an apparatus configured to apply the method of the invention of determining the set point for the thermal sensor.

FIG. 1A schematically illustrates detail of a cross section of a powder bed fusion type apparatus 1, as an example for a 3D printing apparatus, comprising a thermal sensor 72 configured to carry out the method and its variants that will now be described.

In a typical process for the layer-by-layer formation of a 3D object from particulate material, successive layers of particulate material are distributed, each to form a build bed surface 12 which is processed to form successive cross-sections of the object. In this context, the reference to the 'build bed surface' is to the surface of the topmost layer of particulate material. In other words, each newly distributed layer forms a new build bed surface 12 that is the build bed surface of the layer to be processed in that particular cycle of the process.

As indicated in FIG. 1A, the apparatus 1 comprises a container system comprising container walls 10 and a platform 16 that contains the object within a bed of particulate material as it is being built. The build bed 14 is supported by the platform 16, which is arranged to move vertically, within the container walls 10, to lower or raise the build bed surface 12, for example by a piston located beneath the platform. The apparatus 1 further comprises, without specifically showing, a reservoir to supply particulate material to a dosing module that doses an amount of fresh particulate material to be distributed across the build bed 14, thus forming a new build bed surface 12.

Modules for distributing the particulate material and processing the formed layer are provided on one or more carriages moveable across the layer. Accordingly, for illustrative purposes, FIG. 1A shows a carriage 30 arranged on one or more rails 34 that allow the carriage 30 to be moved back and forth above the build bed 14. The carriage 30 comprises a distribution module 32, for example comprising a roller, to distribute a new layer of particulate material over the build bed 14 to form a new build bed surface 12. A droplet deposition module 38, for selectively depositing radiation absorber over the build bed surface 12, is also supported on the carriage 30, for example a fluid deposition module such as a printhead for depositing radiation absorbing fluid over a defined region 50.

A heat source L1 is provided on the carriage 30 to heat the region 50 following deposition of the radiation absorbing fluid. The selectivity of preferentially heating the region 50 versus the surrounding area is achieved by providing the heat source L1 with a spectrum of radiation that, at least partially, overlaps with the absorption spectrum of radiation absorbing fluid but that is not significantly absorbed by the particulate material alone. The radiation-absorbing fluid readily absorbs radiation from the heat source L1 and heats the particulate material it is in thermal contact with (i.e. over the region 50). If the combination of absorber amount and power input to heat source L1 (causing a certain energy input to the region 50) is sufficient, the particulate material of region 50 will, for example, melt/sinter to fuse and form consolidated particulate material. Thus, during a build process of an object, the radiation-absorbing fluid may be deposited over selected portions of the build bed surface 12, so as to define the cross-sections of the object over successive layers.

Figure 1B:
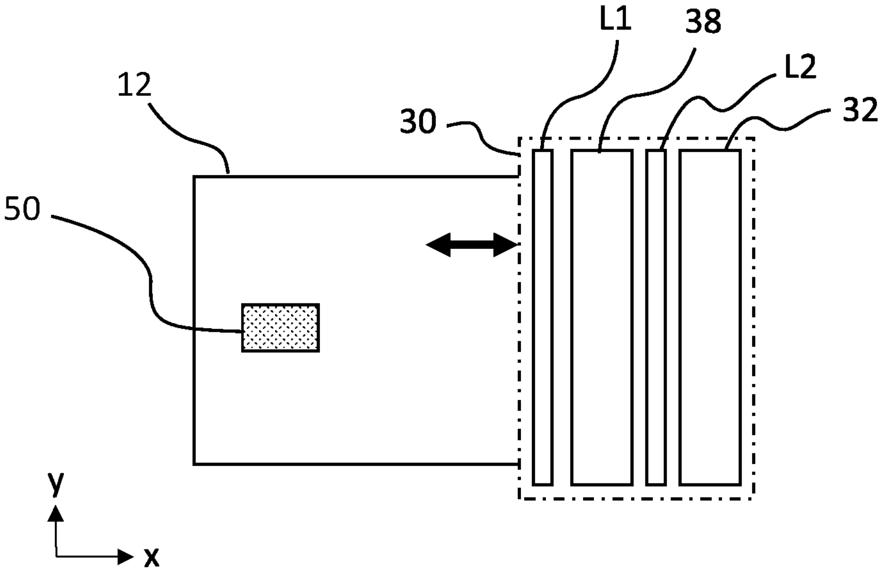
FIG. 1B is a schematic plan view as seen by a sensor of the build bed surface of the apparatus of FIG. 1A.

FIG. 1B shows a plan view of the build bed surface 12 of FIG. 1A with the test region 50 and the carriage 30, with its distribution, deposition and heating modules spanning the width of the build bed surface 12 (along y). As indicated before, the carriage 30 is moveable back and forth along the x-axis, which herein is also referred to as the length of the build bed surface 12, the length being perpendicular to the width, however reference to length and width is not intended to indicate relative extent of the two directions but to merely help reference directions of the process.

In some apparatus, and as exemplified in the apparatus 1 of FIGS. 1A and 1B, a second heat source L2 may be arranged to immediately preheat the layer following distribution by the distribution module 32. Providing a second moveable preheat source L2 may be an effective way of returning the temperature of the new and much colder layer (compared to the previous, processed layer) back towards the target build bed temperature. This may be done in combination with, or in addition to, operating the stationary overhead heater 20 provided above the build bed surface 12. The preheat temperature may be a predetermined temperature lower than the melting temperature and higher than the solidification temperature of the particulate material. The preheat temperature may be slightly lower than the target temperature.

To adequately control the build bed surface temperature, the build bed surface 12 is generally monitored by the thermal sensor 72. The measurements from the thermal sensor 72 are used to apply feedback control to the one or more heating devices to achieve thermal uniformity on the build bed surface 12. If adequately controlled, large temperature differentials between fused and unfused areas may be prevented so that warping or curl of the object can be avoided, allowing for reliable object quality, in terms of mechanical and visual properties, of the finished object. An effective way of achieving temperature uniformity over the build bed surface 12 is to provide a zonal overhead heater 20 having individually controllable heating elements placed above different portions of the build bed surface 12. A feedback loop may be used to control each heater element of the heater array which may be comprised in the overhead heater 20 based on the temperature measurements of the build bed surface 12 by thermal sensor 72. Feedback control may be provided by a controller 70, shown in FIG. 1A. The thermal sensor 72 may be a pyrometer, an array of pyrometers or a thermal camera with a high resolution pixel array able to monitor the entire build bed surface 12. A pixel array may, for example, be used so that different groups of pixels monitor corresponding different zones of the build bed surface 12. In turn, measurements from a group of pixels may be used to control a respective one or more heater elements of the overhead heater 20 to affect the temperature of a corresponding zone of the build bed surface 12, thus achieving zonal control.

In known calibration processes, in which the particulate material is slowly heated until it fuses, methods of controlling heating comprise changing one or both of the duty cycle of the heat source or the speed at which the heat source passes over the test region.

The inventor has discovered an improved method for reliably determining a set point for the scale of temperature measurements by the thermal sensor 72 in an apparatus 1 for the layer-by-layer manufacture of a 3D object from particulate material. The method comprises:

(a) distributing a layer of particulate material, the layer providing a build bed surface 12;

(b) depositing an amount of absorption modifier over at least one of the test region 50 and a surrounding area surrounding the test region 50;

(c) heating the test region 50 over a period of time with a heat source L1;

(d) measuring with the thermal sensor 72 a temperature value TR within the test region;

(e) distributing a further layer of material over the preceding layer of material, the new layer providing the build bed surface 12;

repeating steps (b) to (e) at least until the test region 50 starts to melt, wherein step (b) comprises depositing a further amount of absorption modifier over the test region 50, wherein the further amount of absorption modifier causes the particulate material of the test region 50 to absorb more energy from the heat source L1 than the test region 50 of the preceding layer; and determining a set point for the thermal sensor 72 from a characteristic of the material as identified from a characteristic in the evolution of the measured temperature value TR within the test region 50. This may comprise considering some or all of the measured temperature values TR measured over the steps of the method.

It is found that the process conditions, by which the test region is progressively heated, significantly affect the reliability of the calibration process and its relevance to the build conditions for a 3D object. The outcome of the calibration method is found to be more reliable when the progressive heating effect is achieved by altering the absorptive properties of the test region 50, for example by increasing levels of radiation absorber applied to the test regions 50 of successive layers of build material. This means, for example, that if a subsequent build process, in which the power input to the heat source L1 is substantially constant for example, and/or the duration over which a certain region of the layer is heated is substantially the same for all layers, the calibration process may equally be designed such that these conditions are substantially the same. Furthermore, the method presented herein is thought to provide an improved thermal stability of the calibration process.

In general, the method and its variants described apply to two alternative approaches of causing sintering/melting of the test region 50 by (i) applying an absorption modifier in the form of a radiation absorber over the test region 50, such that the test region 50 absorbs more radiation from the heat source L1 compared to the surrounding area surrounding the test region 50; and (ii) applying an absorption modifier in the form of an absorption inhibitor over both the test region 50 and the surrounding area of the test region 50 in such a way that the test region 50 absorbs more radiation from the heat source L1 compared to the surrounding area surrounding the test region 50, for at least the majority of the layers. For example, more absorption inhibitor per unit area (or a second absorption inhibitor having a stronger radiation inhibiting effect than the first) may be deposited over the surrounding area compared to over the test region 50.

The absorption modifier (absorber or inhibitor) may be deposited in the form of drops by a droplet deposition head, or in any other suitable form, such as powder form, using a suitable powder deposition device.

The radiation of the various heating devices (heat source L1, preheat source L2, overhead heater 20) referred to herein may, preferably, be infrared radiation, and the absorption modifier may be arranged to predominantly absorb infrared radiation (infrared radiation absorber) or to predominantly inhibit the absorption of infrared radiation (infrared absorption inhibitor, such as water acting as a coolant, or a reflector of the radiation of the heat source(s) used to heat the test region 50). However, other wavelength spectra of the heat source(s) may be suitable in combination with respective absorption modifiers and particulate materials. Where the absorption modifier is an absorption inhibitor, such as a coolant or a radiation reflector, that reduces or prevents the absorption of energy from the heat source(s), the entire layer may be provided with absorption inhibitor and such that the surrounding area surrounding the test region 50 is provided with an amount that prevents melting of the particulate material, and such that the test region 50 is provided with successively decreasing amounts of absorption inhibitor. In this way each successive test region 50 is capable of absorbing more heat from the heat source(s) than the preceding test region 50, and such that the test region 50 is capable of absorbing more radiation than the surrounding area surrounding the test region 50.

The method and its variants will now be described in detail with reference to the flow charts of FIGS. 2 and 3, mainly with respect to use of a radiation absorber as absorption modifier; however, it should be noted that equivalent effects may be achieved by use of absorption inhibitor deposited in an appropriate manner by the skilled person.

Figure 2:
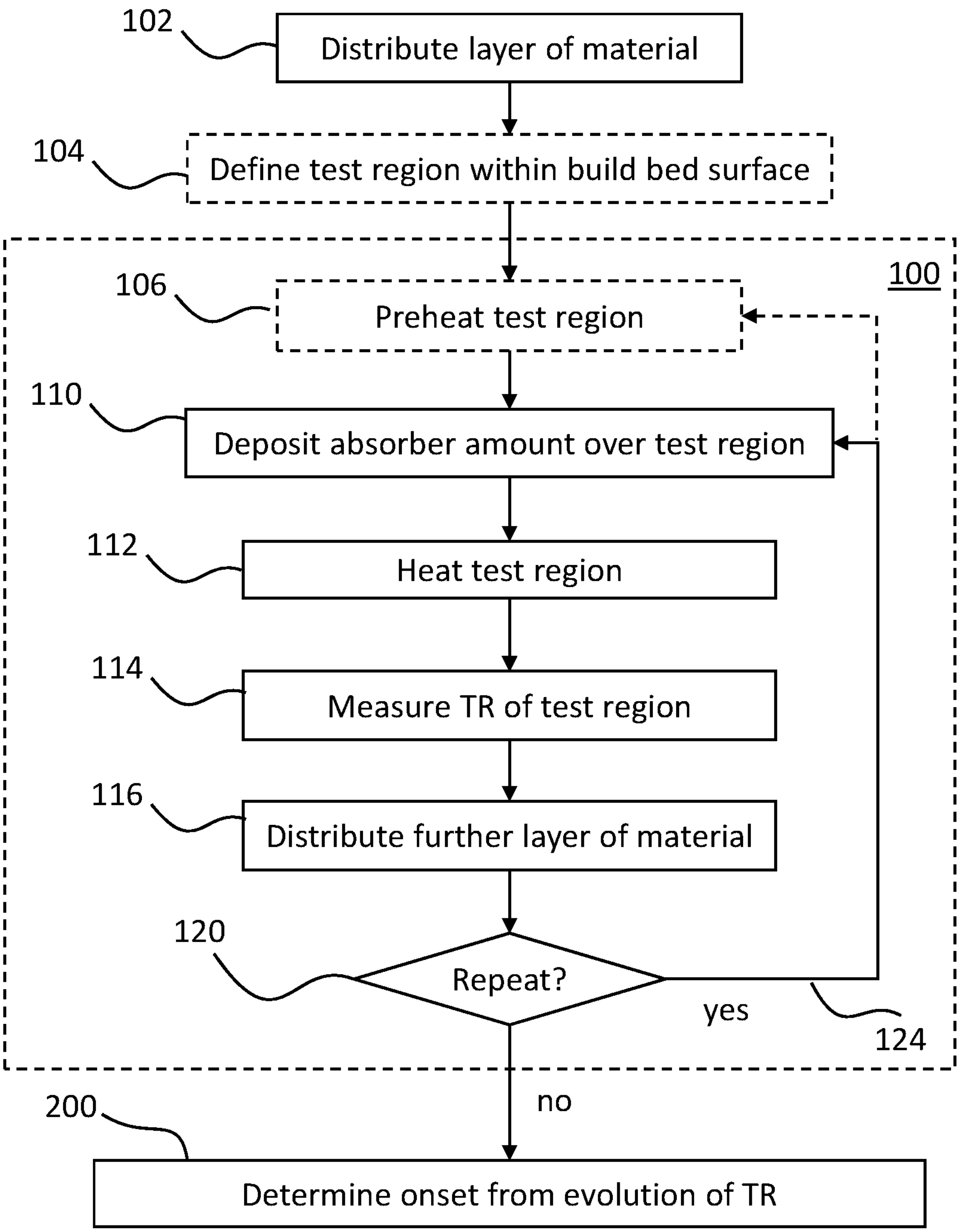
FIG. 2 is a flow chart of the method of the invention.

Turning first to FIG. 2, block 100 comprises the sequence, or layer cycle, of processing steps of each layer, during the calibration sequence according to the method above, after an initial step of distributing a layer of material at block 102 and optionally defining the test region 50 at block 104. The layer and further layers may, for example, be distributed by a roller pushing a portion of particulate material across the build bed 14, or by a device that releases a uniform amount of material from an overhead reservoir, to form the build bed surface 12.

The test region 50 at block 104 may be defined over any suitable part of the build bed surface 12 and may be of any suitable size. The test region 50 may be as illustrated in FIGS. 1A and 1B, or it may comprise a plurality of test areas 500_*n* distributed across the build bed surface, as will be described with reference to FIG. 5. The test region 50 may be defined digitally by providing location data to the controller 70.

Next, at block 110, a radiation absorber is deposited uniformly over the test region 50. The radiation absorber may be deposited in any suitable form, whether in particulate or fluid form. For example, the radiation absorber may be comprised within a fluid and the droplet deposition module 38 may comprise a droplet deposition head, such as a drop-on-demand inkjet printhead, configured to deposit the radiation absorbing fluid. At block 110, therefore, the step of depositing the radiation absorber over the test region 50 may, in one variant of the method, comprise depositing the radiation absorber over the test region 50 using a droplet deposition head, thereby forming a "printed test region". The amount of radiation absorber may, in one variant of the method, be determined by the volume of the fluid deposited by the droplet deposition head per unit area over the test region 50.

After deposition of the radiation absorber, the test region 50 is heated at block 112. The step of heating at block 112 may be carried out by passing a heat source L1, as indicated in FIGS. 1A and 1B, across the test region 50, or the layer, while operating the heat source L1, wherein the wavelength spectrum of the heat source L1 is such that it preferentially heats the test region 50, comprising radiation absorber, compared to the particulate material surrounding the test region 50, not comprising radiation absorber. The period of time over which the test region 50 is heated is, in this case, determined by the speed at which the heat source L1 traverses the test region 50 and transfers heat to the test region 50. Alternatively, the test region 50 may be heated by a stationary heat source, for example by an overhead heater 20, which may comprise an array of heating elements, shown in FIG. 1A, provided that the wavelength spectrum of the overhead heater 20 is such that it is easily absorbed by the radiation absorber. The period of time over which the test region 50 is heated is, in this case, determined by the duration over which the overhead heater 20 is operated to heat the test region 50.

At block 114, following heating at block 112, a temperature value TR, within the test region 50, is measured by the thermal sensor 72, after which a further, new layer of particulate material is distributed.

Next, the series of steps indicated by blocks 106, where present, to 116 or by blocks 110 to 116 is repeated along loop 124 for a number of cycles, as determined at decision point 120. For each repeat, the test region 50 of the further layer is heated to a higher temperature value TR than that of the test region of the preceding layer, until the test region 50 of that layer at least starts to sinter/melt. In some variants, the loop 124 may be repeated for a predefined amount of repetitions within which sintering/melting may be expected. In some variants, the loop 124 may be repeated for a predefined, fixed number of repetitions within which melting may be expected. From previous testing for example the conditions for melting may be predefined, for example after one or more of a certain number of layers; exceeding a certain number of droplets of radiation absorber per unit area of the layer specific region; and exceeding a certain lamp power(s). Alternatively, the layer-specific region may be monitored in real time with an optical sensor which records a colour density change, or a change in the reflectivity as the layer specific region starts to melt and becomes reflective. Once a suitable number of layers has been processed, as determined at decision point 120, the method continues to block 200 to determine the set point for the thermal sensor 72 from a characteristic in the evolution of the measurements of TR. As the material starts to melt, it may continue to partially melt/sinter by surface melting of the particles, so that the particles fuse at least at the boundaries between particles, or it may melt fully, in either case forming a fused mass of material.

The onset of melting represents the start of a phase change and a change in the thermal behaviour of the particulate material may be expected. A characteristic of the melting point of a material may, for example, be a change in the rate of increase of the temperature value TR over the number of layers, due to the latent heat of fusion. The set point may relate to a characteristic material property represented by a phase transition, such as the melting point, but may, in modifications of the process, be the glass transition point or the crystallisation point. In some implementations, a second temperature value may in addition be measured at a different time of the layer cycle to improve the accuracy in determining a thermal characteristic of the material. It should be noted that it is not necessary to correct the scale of the thermal sensor 72 to an absolute scale, as may be determined from an external measurement by e.g. a calorimeter. Instead, it is sufficient to apply a set point relative to the particulate material properties to subsequent measurements of the thermal sensor 72 as determined by the methods disclosed herein, and to control subsequent thermal procedures based on the thermal sensor readings relative to this set point.

In a typical build process, the build bed surface 12 is maintained at, or close to, a predefined target temperature, that is below the melting temperature of the particulate material, and above the solidification temperature. This means it may be maintained within a temperature range of 10-20° C. below the melting temperature.

The fresh particulate material is at a significantly lower temperature, so that the distributed layer has a significant cooling effect on the build bed surface 12 of the previous layer. In order to prevent high temperature differentials that cause warping of the fused parts, it is desirable to immediately increase the temperature of the distributed layer to, or closer to, the target temperature of the build bed surface 12. The step, at block 102, of distributing each layer may, therefore, be followed by a step, at block 106, of preheating each layer to a preheat temperature value, before the step of depositing radiation absorber at block 110, wherein the preheat temperature value is lower than the melting temperature and higher than the solidification temperature of the particulate material. In FIG. 2, this block 106 is indicated in dashed outline, and elevates the temperature of the new layer to the preheat temperature that is, or is close to, the target temperature.

This means that at decision point 120, the repeat loop 124 may be initiated to loop back to block 106 of preheating the further layer distributed at block 116, as indicated by the dashed arrow as optional loop back point of loop 124. Any suitable preheating device may be provided to preheat each newly distributed layer. Where a moveable preheat source L2, as shown in FIGS. 1A and 1B, is used, the step of preheating each distributed layer may comprise passing the moveable preheat source L2 across the layer while operating the preheat source L2 to preheat the test region 50, and preferably the layer. The wavelength spectrum of the preheat source L2 is such that, over the preheat duration of time, it is capable of sufficiently preheating the test region 50 up to, or towards, the target temperature when the test region/layer is not comprising radiation absorber. The target temperature may be achieved in combination with, for example, operating an overhead heater 20, as shown in FIG. 1. For example, after at least one or more of the layer cycle steps, the temperature of the build bed surface 12 may be measured using the thermal sensor 72; and the stationary heat source 20 (overhead heater) provided above the build bed surface 12 may be operated to heat the build bed surface (12) based on the measured temperature and a predefined target layer temperature that is between the solidification temperature or glass transition temperature and the melting temperature of the particulate material, so as to maintain the build bed surface (12) at the target layer temperature. The the stationary heat source may be operated continuously throughout the layer cycle, and may be operated in the same way during a subsequent build process.

As for the heat source L1, the period of preheat time may be determined by the speed at which the preheat source L2 traverses the test region 50 and transfers heat to the particulate matter of the test region 50. The speed may be the same as that of the heat source L1. Alternatively, the overhead heater 20 may be arranged to provide the preheat function of block 106.

It should be noted that it is not necessary to immediately proceed from one layer of the layer cycle described herein to the next layer. The method may equally function if, between adjacent layer cycles of the number of layer cycles, a different layer cycle to the number of layer cycles is carried out, such as a number of unprocessed, blank layers that are distributed without the steps of depositing absorption modifier and heating with the heat source L1 at block 112. Thus, one or more intermediate layer cycles are applied that are different to the layer cycle of the disclosed calibration method.

Achieving Successively Higher Heating

It was found that the set point for the thermal sensor 72 can be determined with better reliability with respect to the build process when, for each layer, the amount of radiation absorbed per unit area of the test region 50 is altered to achieve progressive heating of the test region 50. A further improvement may be achieved when, preferably, during each layer cycle, the input power and spectrum of the heat source L1 are kept the same as for all other layer cycles. For example, the speed of the passing the heat source L1 over the test region 50 in a first direction, such as from left to right along x, as indicated in FIG. 1, may be a substantially constant speed, and may be the same for each layer, so that the duration of heating of the test region 50 is the same for each layer. Furthermore, the heat source L1 may be operated at substantially the same power input for each layer. In this way, a different level of heating of the test region 50 may be achieved solely, or at least predominately, by altering the amount of absorption modifier deposited for each layer. For example, where the absorption modifier is radiation absorber, the amount of radiation absorber deposited over the test region 50 may be increased for each further layer. Additionally, the speed and/or power input to the preheat source L2 may be substantially the same, and optionally constant, for each layer. The thermal impact of the heat source L1 and, optionally, preheat source L2, over the build bed surface 12 may thus be the same at all locations.

These improvements may be due to the following. Changing the input power of a heat source L1 may affect the radiated energy due to changes in the temperature of the actual heat source L1. In addition, thermal lag of the heat source L1, when changing duty cycle, requires a period of stabilisation at each different power setting. Furthermore, variations in speed of the heat source L1 might cause variable flow behaviour near the build bed surface 12, and thus near the measured test region 50. While these changes may be small, they appear to be significant enough to affect the reliability in determining the correct set point for the thermal sensor 72. Thus by using, at least predominantly, the amount of absorber to alter the level of heating of each layer, while keeping all other variations to a less significant level, the accurate determination of the set point for the thermal sensor 72 may be improved. In this way it is possible to maintain the heat source L1 at a stable input power and/or speed of passing and avoid the challenges described above that may introduce unknown and uncontrollable process variation.

The temperature to which the test region 50 is heated may, therefore, be solely, or at least predominately, dependent on the amount of absorption modifier (e.g. radiation absorber). The amount of absorption modifier, and thus the level of absorption, may be varied for each layer so as to increase the level of heating of the test region 50 by one or more of the following, in broad terms regarding absorption modifier:

(i) the coverage of the absorption modifier over the test region 50 as defined by the amount of absorption modifier per unit area. For each subsequent layer, the method may thus comprise depositing a further amount per unit area of absorption modifier over the test region 50, wherein each further amount of absorption modifier per unit area is different to the preceding amount of absorption modifier per unit area. In the case of radiation absorber, the amount of radiation absorber deposited per unit area over the test region 50, for each further layer, may thus be higher than that deposited over the test region 50 of the preceding layer. Varying the amount of absorption modifier for each subsequent layer may conveniently be achieved by providing the absorption modifier comprised within a fluid, and depositing the amount of absorption modifier over at least one of the test region 50 and a surrounding area surrounding the test region 50 using a droplet deposition module 38. The module 38 may comprise one or more droplet deposition heads, such as drop-on-demand inkjet heads. In the case of radiation absorber, the radiation absorbing fluid is deposited over the test region 50 only. In the case of absorption inhibitor, the fluid may be deposited in different amounts per unit area over the test region 50 and over the surrounding area, such that the surrounding area absorbs less radiation from the heat source L1 than the test region 50.

The coverage may be defined by one or both of the print pattern, determining the spacing between drops deposited (as controlled by the printed image pattern and/or by a dither scheme), and the volume of each drop deposited at each location on the test region 50. For certain droplet deposition modules 38, the volume of radiation absorber per unit area may be altered by changing the number of drops deposited per location (e.g. per defined voxel), or by changing the actual volume of the drops deposited per location over the test region 50. For example, a drop-on-demand printhead capable of depositing different drop volumes, or multiple smaller droplets to form the drop volume, may be used to deposit one droplet, or the smallest drop, per voxel for a low heating effect, and multiple droplets/a larger drop to achieve a higher heating effect. In addition, a dither scheme may be applied for further degrees of freedom to space the drops or droplets out by defining which voxels are to receive the fluid, such as by defining that only 20% of the voxels are to receive a defined number of one or multiple droplets in a randomly distributed manner. For each further layer, therefore, one or more of the following may be used to alter the coverage of absorption modifier over the test region 50 at block 110:

- depositing a different number of drops of fluid (in the case of a radiation absorbing fluid, a higher number of drops; in the case of inhibitor fluid, a lower number of drops), per unit area, over the test region 50, compared to the number of drops deposited, per unit area, over the test region 50 of the preceding layer, where the volume per drop may be substantially constant; and
- depositing drops of fluid of a different volume (in the case of a radiation absorbing fluid, a larger volume of drops; and in the case of inhibitor fluid, a smaller volume of drops), per unit area, over the test region 50, compared to the volume of each of the drops deposited, per unit area, over the test region 50 of the preceding layer.

In a specific example, a radiation absorbing fluid of fixed absorber pigment loading is provided. The absorbing pigment may be carbon black. By depositing increasing absorber amounts per unit area of the test region 50, for each layer, using a droplet deposition head capable of depositing the fluid at different spacings and/or volumes, the temperature to which the test area 50 will heat, when being heated by the heat source L1, may be increased. Per layer, the absorption modifier may be deposited during one pass over the test region 50 of the droplet deposition module 38. However, in some apparatus, the absorption modifier may be deposited in more than one pass of the droplet deposition module 38, such that the step of depositing a further amount of absorption modifier, at at least one of the blocks 110, comprises, compared to the preceding amount of absorption modifier, depositing a higher number of droplets of fluid per unit area over the test region 50 (e.g. where the absorption modifier is radiation absorber) or the area surrounding the test region (e.g. where the absorption modifier is absorption inhibitor) by operating the droplet deposition head while passing it more than once over the test region 50 of the further layer.

(ii) The type of absorption modifiers. Multiple absorption modifiers (e.g. radiation absorbers) may be provided to the apparatus 1 such that, for each further layer, a different absorption modifier is deposited over the test region 50, wherein each different absorption modifier is capable of causing the particulate material of the test region 50 to absorb a different amount of energy of radiation from the heat source L1, compared to the absorption modifier deposited over the test region 50 of the preceding layer. In a variant, the different absorption modifiers may be such that each absorption modifier comprises a different colour of absorption modifier (radiation absorber or absorption inhibitor), capable of absorbing a different, larger, amount of energy of the radiation spectrum provided by the heat source L1, compared to that of the preceding amount of absorption modifier (radiation absorber or absorption inhibitor).

The different absorption modifiers may be comprised within, or be in the form of, fluids deposited by different droplet deposition heads comprised within the droplet deposition module 38, or by different droplet deposition modules 38.

For example, for each further layer, a different fluid may be deposited by one or more respective further droplet deposition heads, wherein the different fluid is capable of causing the particulate material of the test area 50 to absorb a higher amount of energy of the radiation of the heat source L1, compared to that of the preceding fluid. The different fluid may comprise one or both of a different absorption modifier, capable of absorbing a different amount of energy of the radiation provided by the heat source L1 than the preceding radiation absorber; and a different concentration, e.g. expressed in percent weight per volume, of the absorption modifier, compared to that of the preceding fluid.

Where the absorption modifier is a radiation absorber provided in form of a fluid, or comprised within a fluid, each step of depositing a further amount of radiation absorber at block 110 may comprise, compared to the preceding amount of radiation absorber, one or more of a different radiation absorber, capable of absorbing a higher amount of energy of the radiation spectrum provided by the heat source L1 than the preceding radiation absorber; and a higher concentration of the radiation absorber compared to that of the preceding fluid. For example, two or more types of fluid may be provided within the apparatus 1, each comprising the same radiation absorbing substance but at different concentrations. In other words, the further radiation absorber may be of a type that comprises an infrared radiation absorbing substance at higher concentration than the radiation absorber deposited over the test region 50 of the preceding layer. Multiple droplet deposition heads may thus be configured to deposit multiple different absorbers, which may comprise different infrared radiation absorbing dyes, pigments, or the same infrared radiation absorbing dyes or pigments but at different concentration, each having a different level of absorption of the wavelength spectrum of the heat source L1.

Each further amount of absorption modifier may be represented by a different type, or by a combination of different types, of absorption modifier. In an example, different colours, having different absorptive properties, are provided, for example in the form of different fluids comprising each a different pigment or dye, each having a different absorption spectrum. A first absorber colour, representing a first amount of absorption modifier, may be arranged to absorb the lowest amount of radiation provided by the heat source L1; a second colour, representing a second, further amount of absorption modifier, may be arranged to absorb more of the heat source radiation than the first; a third colour more than the second and so on.

The different colours may be deposited on successive layers, potentially with combinations of colours, to provide gradation in absorption, and thus in the increase in temperature of the layer, when heated by the heat source L1. For example, a colour deposition scheme, similar to colour printing, may be applied in which each colour is capable of absorbing a different amount of the heat source radiation. In this way, multiple fluids provided to the apparatus 1 may be deposited, in an overlapping multi-fluid pattern, to achieve additional degrees of freedom for varying the absorption of the energy of the radiation of the heat source L1. The further radiation absorber (or absorption modifier) may thus be deposited in the form of a pattern of a preceding fluid, comprising radiation absorber (or comprising absorption modifier), and subsequent fluid, comprising radiation absorber (or comprising absorption modifier), wherein the two patterns are arranged to overlap, by operating respective droplet deposition heads while passing them over the test region 50 of the further layer, wherein the further fluid, comprising radiation absorber (or radiation modifier), is capable of absorbing an intermediate amount of energy of the radiation spectrum provided by the heat source L1, compared to the preceding and subsequent fluid, comprising radiation absorber (or comprising absorption modifier).

More broadly, the radiation absorber (or absorption modifier) may be deposited in the form of a multi-fluid pattern, wherein the multi-fluid pattern deposited over the test region 50 of each further layer is different to that deposited over the test region 50 of the preceding layer, and such that the test region 50 is capable of absorbing a higher amount of energy of radiation, provided by the heat source L1, compared to the test region 50 of the preceding layer.

Figure 3:
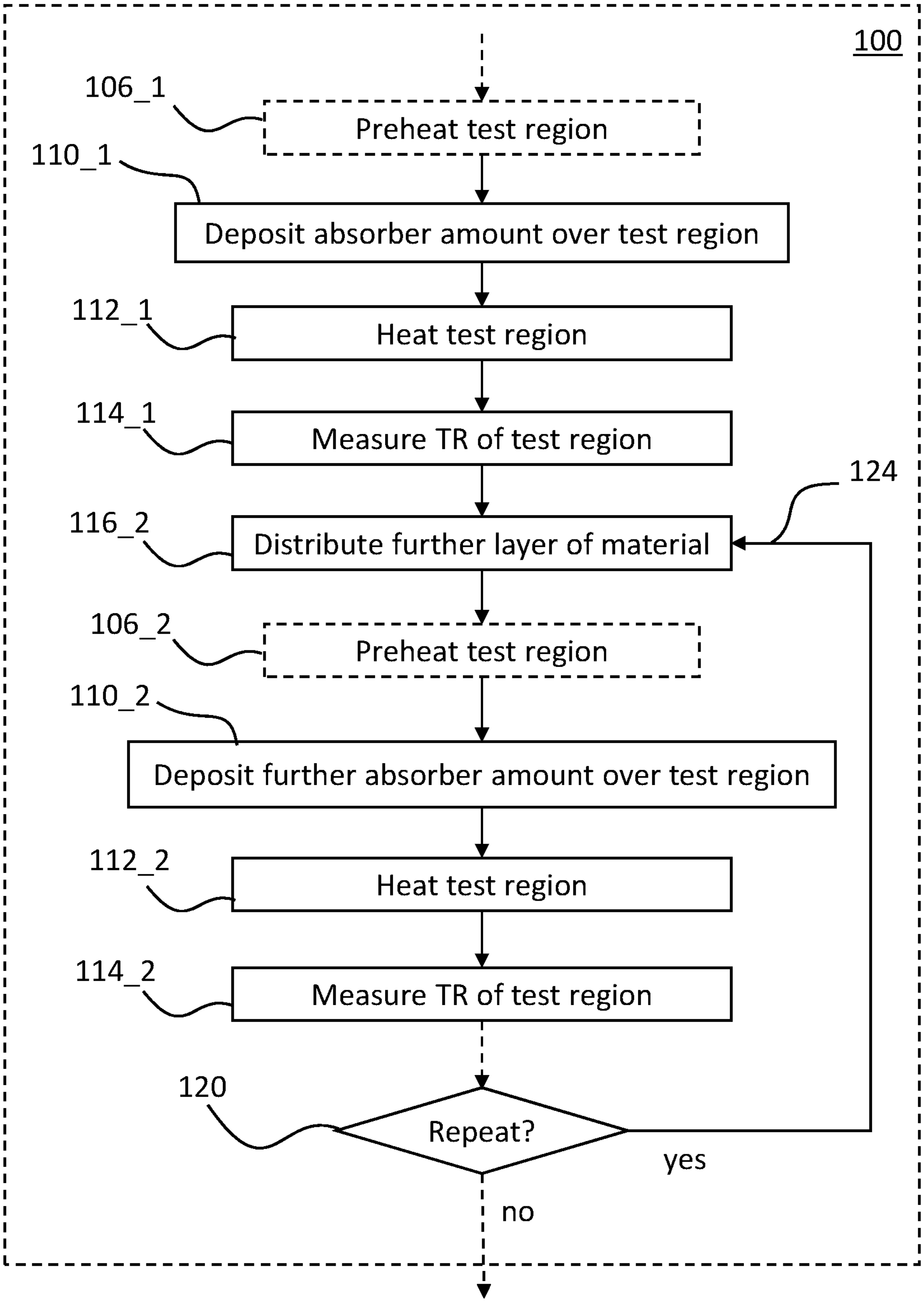
FIG. 3 provides further detail of block 100 of the flow chart of FIG. 2.

FIG. 3 provides additional detail for the heating step at block 110 in the flow chart of FIG. 2. Two layer cycles are shown, in FIG. 3, in a case where the absorption modifier is radiation absorber. The initial steps of the first cycle of process sequence 100, namely that of distributing a layer at block 102 and of defining the test region at block 104, are not shown but apply equally as for FIG. 2.

After block 104, the layer may, optionally, as indicated by the dashed outline, be preheated at block 106_1.

At block 110_1, a first amount of radiation absorber M1 is deposited over the test region 50. At block 112_1, the test region 50 is heated to a temperature as determined by the first amount of radiation absorber deposited per unit area of the test region 50. The temperature value TR 1, as determined by the first amount of radiation absorber M1 (potentially lower than the actual value heated to, due to, for example, a short delay between heating and measuring) is measured by the thermal sensor 72 at block 114_1.

A fresh layer of particulate material is distributed at block 116_2 and the second cycle is initiated at decision point 120. In the second cycle, at optional block 106_2, the test region 50 may be preheated.

Next, at block 110_2, a second amount of radiation absorber M2, larger than the first amount M1, is deposited over the test region 50.

At block 112_2, the test region 50 is heated to a temperature value as determined by the second amount of radiation absorber M2 deposited per unit area of the test region 50.

At block 114_2, the temperature value TR_2 is measured by the thermal sensor 72. TR_2 is also determined by the second amount of radiation absorber M2, potentially after a short period of cooling due to a delay between heating and measuring.

After this, the layer cycles may continue with a third and fourth amount Mn of radiation absorber and so on, each new amount being higher than the previous one, so as to cause an increase in the heating of the test region 50 and of the measured temperature value TR. In variants of FIG. 3, blocks 110_1 and 110_2 may comprise depositing a first type of radiation absorber (or colour) over test region (at block 110_1) and depositing a second (further) type of radiation absorber (or colour) over test region (at block 110_2), wherein the second type of radiation absorber (or colour) causes a temperature value TR higher than that of first type of radiation absorber (or colour) deposited over the test region 50 of the previous layer. Once at decision point 120 the loop 124 is terminated, the method progresses to sequence process 200 as shown in FIG. 2.

Figure 4:
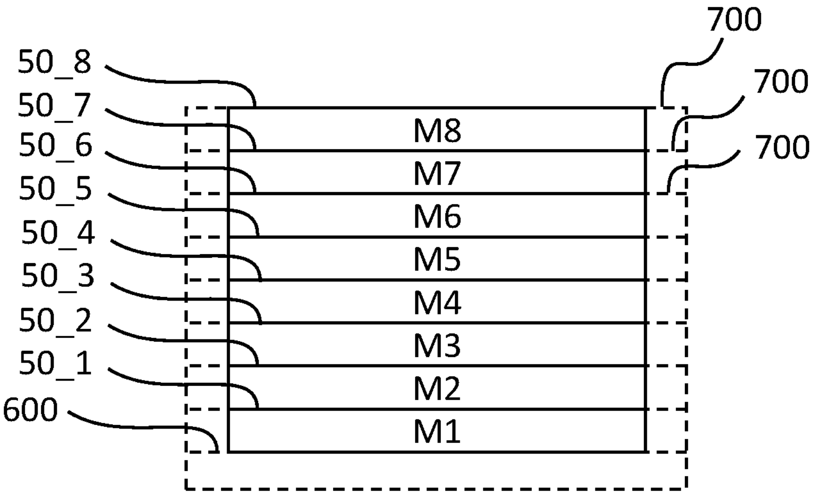
FIG. 4 is a schematic cross-section of a test object formed by a variant of the method.

A resulting test object, comprising the test regions 50 of the successive layers processed according to a variant of the flow chart of FIG. 3, is schematically illustrated in FIG. 4. A fixed number of layers may be processed by repeating loop 124, in FIG. 3, a predefined number of times and as determined at decision point 120.

The amount of radiation absorber for each layer is indicated by Mn. The onset of melting may be expected to occur, for example, for layers with radiation absorber amounts M4 to M7. Here for example, the onset of melting may have been caused by the amount M6 of radiation absorber over the test region 50_6 of the sixth layer. The set point for the thermal sensor 72 may thus be defined as the temperature value TR_6 so as to be related to the onset of melting of the particulate material. In this variant, the amount of radiation absorber is increased for each new layer, such that for each further layer, the amount of radiation absorbing fluid deposited over the test region 50_*n* is larger than that deposited over the test region 50_*n*−1 of the preceding layer. Optionally, the amount of radiation absorber may be increased by a fixed amount over that deposited over the test region 50_*n*−1 of the preceding layer; however, this is not essential. It is also not essential to provide a linearly increasing rate of heating from layer to layer.

Measured Temperature Values of the Test Region

The temperature values TR as measured unlikely represent true temperatures of the test region 50, but are offset by an amount to be corrected. Therefore, they are referred to as 'temperature values' rather than 'temperatures'. Furthermore, it should be noted that, depending on the arrangement of the heat source L1 and the thermal sensor 72, the temperature values TR may be measured only after a delay following heating of the test region 50. This may be due to the test region 50 being obstructed from the field of view of the thermal sensor 72 by the moveable heat source L1, or the carriage 30 of the moveable heat source L1, as it passes underneath the sensor 72.

It is not essential that the temperature values TR are measured over the entire test region 50. The measurements, at block 114, may be carried out over corresponding subregions defined within the test region 50, or they may, for example, relate to one or more temperature values TR sensed by more than one sensor 72, or group of sensor pixels, over some or all of the test region 50.

The thermal sensor 72 may be a thermal camera with a high resolution pixel array able to monitor the build bed surface 12. Certain pixel groups may be arranged to monitor corresponding zones of the build bed surface 12. Likewise, a plurality of pixels may be arranged such that each of the plurality of pixels measures a temperature value TR for a corresponding one of a plurality of locations, or areas, of the test region 50. The steps of measuring the temperature values TR may comprise: measuring, with each of the plurality of pixels, a temperature value TR at a respective one of a plurality of locations or areas defined over the test region; such that the set point is based on temperature values TR measured by each of the plurality of pixels for that layer.

The test region 50 may comprise a plurality of test areas distributed over the build bed surface 12 that may or may not form a continuous combined test region 50.

Figure 5:
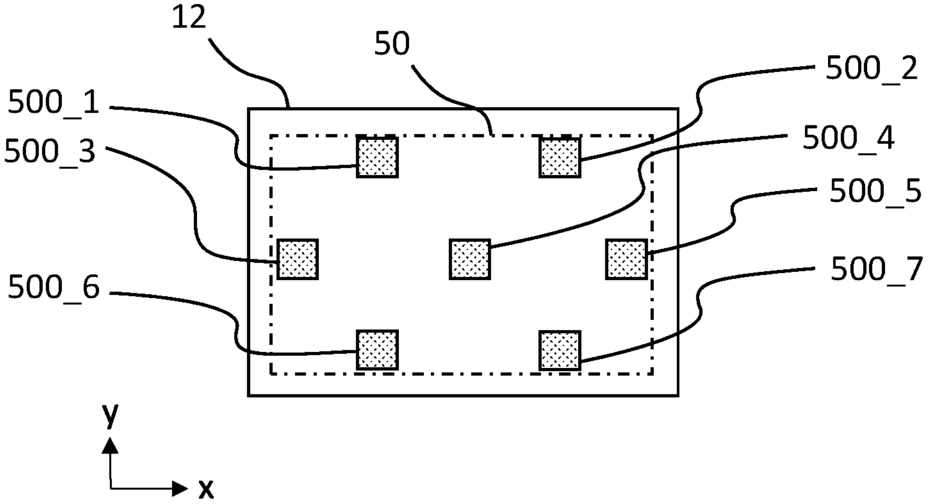
FIG. 5 is schematic plan view of a build bed surface over which a plurality of test areas are defined.

As illustrated by way of example in FIG. 5, a plurality of test areas 500_1 to 500_7 may be arranged at discrete locations, which together represent the test region 50, as indicated in dashed outline. Referring to the flow chart of FIG. 2, at block 104 therefore, the step of defining a test region 50 may comprise defining a plurality of test areas 500_*n* within the test region 50 and distributed over the build bed surface 12. The thermal sensor 72 may comprise a plurality of sensor pixels, such that, at block 114, the step of measuring the temperatures values TR comprises measuring, within each test area 500_*n*, a respective temperature value TR with a corresponding one or more pixels of the plurality of sensor pixels. At block 200, the set point may thus be determined for each of the plurality of sensor pixels, based on the measured temperature value TR for each test area 500_*n* of each layer. The measured temperature values TR, at block 114, may thus be average measured temperature values TR determined from measurements of TR at a plurality of locations over each test area 500_*n* (or over the test region 50, where no test areas are defined). For each group of one or more of the plurality of pixels, a respective set point may be determined from the evolution of the measured respective temperature values of TR measured by that group.

Alternatively, an overall average set point may be determined for the pixels of the thermal sensor 72. Where the test areas are measured by all pixels of the sensor, the average may be determined from the measurements of TR by each of the plurality of pixels.

The test areas 500_*n* may be defined to correct position dependent deviations of the thermal measurements, for example due to the optics of the thermal sensor 72. For each pixel, or for each group of pixels of the plurality of pixels, a respective correction factor or offset value, with respect to the universal average set point, may be determined and applied to future measurements of the thermal sensor pixels. In other words, a per-pixel digital correction mask may be defined to correct future measurements of the thermal sensor 72.

Furthermore, it is not essential that each layer cycle comprises only a single layer. In variants, each layer may comprise a set of sublayers, and each sublayer is processed according to the same conditions for the steps of distributing (and optionally of preheating), depositing absorption modifier such as radiation absorber and heating of that layer. At block 114, an average temperature value may be determined from respective measured temperature values TR of one or more of the sublayers for that layer. Over, for example, the first few sublayers, thermal stability may be reached and any temperature values measured are ignored, while from each of the remaining sublayers of that layer, a respective average temperature value for TR is determined for the measured temperature values TR within the test region 50. Each test area 500_*n* may be comprised of a plurality of sublayers as described. Thus the measured temperature for the test region 50 of each layer may be based on at least one of the respective temperature values TR measured for one or more of the sublayers, one or more of the test areas 500_*n*, and for one or more location within each test area 500_*n*.

It should be noted that heating the test region 50 may mean irradiating the entire build bed surface 12, while selectively heating only the test region 50 due to it being defined by radiation absorber. In some variants, the test region 50 may be heated selectively by a selective radiation source such as an LED array or a laser.

Returning to FIG. 4, the test object resulting from the calibration process may comprise layers, towards the start of the sequence, that are not fused, for example those that received a relatively low amount of radiation absorber. This may be, for example, layers 50_1 and 50_2 having the lowest amounts of radiation absorber M1, M2 applied to them. This might mean that in a depowdering process, during which the object is removed from the build bed 14 and the surrounding particulate material recovered to be recycled, the first few layers are not consolidated and contaminate the surrounding particulate material. In this case, it may be beneficial to encapsulate the test object by a fused shell. Such a fused shell is indicated by the dashed outline of a supporting or base test region 600, below the first layer with M1 amount of radiation absorber, and a boundary region comprised of portions 700 of each layer. Each portion 700 may be provided with an amount of radiation absorber that ensures fusing occurs upon heating with the heat source L1, for example an amount M7 or M8 applied to layers 50_7 and 50_8. When a drop-on-demand inkjet printhead is used to deposit the radiation absorber, the boundary regions may easily be created by depositing a higher amount of radiation absorber over the boundary portions 700 that fuses the particulate material during heating, at block 112, to form a shell. The topmost layer 50_8 may represent the fused cover of the shell; alternatively, a further layer 600 (not shown) may be provided on top of layer 50_8 to represent the fused cover of the shell.

Before the step of distributing a layer of particulate material, the following steps may thus be carried out one or more times:

- distributing a base layer of particulate material, the base layer providing the build bed surface 12;
- defining a base region 600, the base region overlapping with the test region 50;
- depositing an amount of absorption modifier, for example radiation absorber, over the base region 600;
- heating the base region 600 over a period of time to cause the particulate material of the test region 50 to fuse;
- wherein the step of depositing an amount of radiation absorber over the test region 50 of each layer comprises depositing a fusing amount of radiation absorber over a boundary portion 700 surrounding the test region 50; and wherein the step of heating the test region 50 of each layer over a period of time comprises heating the boundary portion 700 over the period of time to cause the particulate material of the boundary portion 700 to fuse. In this way, the base region 600 of the base layer, the boundary portions 700 of each successive layer and, optionally, a topmost fused layer provide a shell around the calibration layers so as to encapsulate them.

Where absorption inhibitor is used to define the base region 600, the base region 600 may not comprise absorption inhibitor while the surrounding area surrounding the base region 600 is provided with absorption inhibitor, so that, during the step of heating the base region 600, the particulate material of the base region 600 sinters/melts to fuse, while the surrounding material does not. Similarly, the boundary portions 700 may be left void of absorption inhibitor while the area outside the boundary portions 700 and the test region 50 is provided with sufficient absorption inhibitor to prevent it to sinter or melt, and while the test region 50 inside the boundary region 700 is provided with successively decreasing amounts of absorption inhibitor so that each successive test region 50 absorbs more heat than then preceding test region 50.

A test object resulting from the method of providing a shell to encapsulate the test regions 50 of the layers may thus be formed from the sequential test regions 50_1, 50_2, . . . , such that the test object comprises a fused outer surface and a sequence of inner test layers of increasing degree of consolidation of particulate material. Such a test object is easily removed during a depowdering process and discarded without contaminating any of the powder to be recovered and recycled. Optionally, where multiple test areas 500_*n* are comprised within the test region 50, the test areas 500_*n* may be linked by fused interconnecting regions that form a grid connecting all test areas 500. In this way, the test areas 500_*n* can be recovered easily during depowdering of the object.

Direction and Timings of Method Steps

The period of time of heating the test region 50 determines in part the amount of energy transferred to the test region 50. The amount of energy absorbed by the test region 50 may further be determined by at least one or more of the input power of the heat source L1, the absorption of heat due to the absorption modifier in relation to the wavelength spectrum of the heat source L1, and the coverage of the absorption modifier over the test region 50. As described above, the period of time of heating and/or the power input to the heat source L1 are preferably kept substantially constant and the same for each layer.

In addition, a preferred process provides for improved thermal consistency where the steps of distributing each layer and passing a moveable heat source L1 across each layer, so as to heat it, are carried out in the same, e.g. first, direction. Similarly, the steps of distributing each layer and of passing the preheat source L2 across each layer may also be carried out in the same, e.g. first, direction. For example, when the distribution module 32, the preheat source L2 and heat source L1 are provided on a single carriage 30, the steps are carried out when the carriage 30 moves in a first direction, such as from left to right along x, as indicated in FIG. 1. When several carriages are used, for example where the distribution module 32 and the preheat source L2 are mounted to a first carriage and the deposition module 38 and the heat source L1 are mounted to a second carriage, the steps are carried out when the respective carriages move along the first direction only, and not along a second direction opposite the first direction or perpendicular to the first direction. During movement along the second direction, at least the heat source L1 and the distribution module 32 are not operated. The methods described herein may provide set points of enhanced relevance to a subsequent object build process when, in addition, the subsequent build process for a 3D object comprises steps of distributing a fresh layer, preheating the layer, and heating the layer that are carried out in the same direction as those of the calibration process; optionally, the step of depositing radiation absorber may also occur in the same direction. Furthermore, the subsequent object build process, similar to the calibration process, may comprise conditions of operating the heat source L1 and/or preheat source L2 that are substantially the same as those during the calibration process. For example, the respective power inputs for each heating and/or preheating step for each layer may be kept substantially the same, or at least similar, as is made possible by the calibration methods disclosed herein. Where the heat source L1, and/or preheat source L2, is a moving heat source, the speed of passing the heat source/preheat source is preferably the same during the layer cycle of the build process and during that of the calibration process.

Preferably, each step of distributing, preheating, depositing absorption modifier/radiation absorber and heating is carried out at the same constant speed in both the calibration method and the build process, and, preferably, at respective constant timings between steps.

Preferably, the step at block 114, of measuring the temperature of the test region 50, is initiated after a first time delay after the step at block 112 of heating with the heat source L1, and the respective first time delay is the same for each layer. Additionally, or instead, the respective time periods between the initiation of each step and the initiation of the previous step, in each layer cycle, may be constant for each corresponding step in each successive layer cycle. For example, preferably, the layer cycle further comprises: initiating the step at block 116, of distributing each further layer, after a first time interval from initiating the step 112 of heating the test region (or the build bed surface 12) of each layer with the heat source L1, and initiating the step at block 112, of heating the test region 50 (or the build bed surface 12) with the heat source L1, after a second time interval after the step at block 116 of distributing the layer. In a preferred variant of the method, and for the corresponding steps of a layer cycle of a subsequent build process, the respective first and second time intervals remain the same for each layer. Furthermore, for each layer, the layer cycle may further comprise: initiating the step at block 106, of preheating the test region (or preheating the build bed surface 12) with the second preheat source L2, after a third time interval from initiating the step at block 116 of distributing the layer, and wherein the third time interval is, preferably, the same for each layer. In this way, the respective return movements along the second direction opposite the first direction of the heat source L1, of the preheat source L2, and of the distribution module 32, is also the same for each layer, and thus the duration of the layer cycle is the same for each layer. This is preferable as it provides enhanced thermal uniformity of the process.

Furthermore, in a preferred variant of the method, the heat source L1 and the preheat source L2 are operated continuously as they move over the build bed surface 12. Thus the velocities and input powers applied to the heat sources and to the distribution module 32 relate to the duration over which the respective heat source and the powder distribution module 32 are moved over the build bed surface 12.

Additionally, the step of heating may be carried out at a constant power input to the heat source L1 for the period of time over which the test region 50 is being heated, and the step of preheating may be carried out at a constant power input to the preheat source L2 for the period of time over which the test region 50 is being preheated. In this way, the amount of absorption modifier may predominantly determine the level of heating of the test region 50 for each layer during the calibration process and also in the subsequent build process.

The method and its variants as described may be carried out by a controller 70 of the apparatus 1, configured to carry out any of the method or variants in part or fully. The controller 70 may, for example, control the power input to one or more heating devices of the apparatus 1 during a subsequent object build process based on the determined set point. Corrections based on the determined set point may be applied to the temperature measurements of each group of pixels or to each pixel of the thermal sensor 72. The set point may be determined again at any time to adjust for changes in material properties due to recycling rate and/or ageing of at least some of the components of the particulate material.

The invention claimed is:

1. A method for determining a temperature set point for calibrating the thermal measurement scale of a thermal sensor positioned above a build bed surface in an apparatus for the layer-by-layer manufacture of a three-dimensional object from particulate material; the method comprising sequentially performing layer cycle steps (a) to (f) of:

(a) distributing a layer of particulate material, the layer providing the build bed surface;

(b) preheating the layer to a preheat temperature value by passing a preheat heat source across the layer while operating the preheat heat source to preheat the layer to a preheat temperature, wherein the preheat temperature value is lower than the melting temperature of the particulate material;

(c) depositing an amount of absorption modifier over at least one of a test region and a surrounding area surrounding the test region;

(d) heating the test region over a period of time by passing a second heat source across the layer while operating the second heat source, and wherein the period of time over which the test region is heated is determined by the speed of the second heat source relative to the test region;

(e) measuring with the thermal sensor a temperature value TR within the test region;

(f) after at least one or more of the layer cycle steps, measuring the temperature of the build bed surface using the thermal sensor; and operating a stationary third heat source provided above the build bed surface continuously throughout the layer cycle based on the measured temperature and a predefined target layer temperature between the solidification temperature and the melting temperature of the particulate material, so as to maintain the build bed surface at the target temperature;

wherein the steps (a) of distributing each layer, (b) of passing the preheat source across each layer and (d) of passing the second heat source across each layer are carried out in the same direction;

wherein the steps (a) to (f) of the layer cycle are repeated one or more times, wherein the repeating of step (a) includes distributing a further layer of material over a preceding layer of material, the further layer providing the build bed surface;

wherein the step of distributing each further layer is initiated after a first time interval from initiating the step of heating with the second heat source, and wherein the step of heating with the second heat source is initiated after a second time interval from initiating the step of distributing the layer, and wherein the first and second time intervals are the same throughout the calibrating of the thermal measurement scale of the thermal sensor;

wherein the repeating of step (c) comprises depositing an amount of absorption modifier over at least the test region, such that, compared to the preceding layer, the test region of each further layer reaches a higher temperature value TR, by: at step (c) depositing a different amount, or a different absorption modifier, per unit area over the test region, wherein the different amount or the different absorption modifier is capable of absorbing a different amount of energy of the radiation spectrum provided by the second heat source;

wherein for at least one of the further layers the different amount or the different absorption modifier is sufficient to cause the particulate material of the test region to start to melt;

identifying a characteristic in the layer-by-layer evolution of the measured temperature value TR measured for each layer;

determining from the determined characteristic a temperature set point for the thermal sensor; and applying the determined temperature set point to subsequent measurements of the thermal sensor.

2. The method of claim 1, wherein each layer comprises a set of sublayers, wherein each sublayer is processed according to the same layer cycle steps (a) to (f), and wherein the measured temperature value TR of each layer is an average temperature value based on the respective temperature values TR measured within the test region of one or more of the sublayers of that layer.

3. The method of claim 1, wherein each layer comprises a set of sublayers, wherein each sublayer is processed according to the same layer cycle steps (a) to (f), and wherein the measured temperature value TR of each layer is an average temperature value based on the respective temperature values TR measured within the test region of one or more of the sublayers of that layer.

4. The method of claim 1, wherein the step of defining a test region comprises defining a plurality of test areas arranged over the build bed surface; wherein the thermal sensor comprises a plurality of sensor pixels, such that step (e) comprises measuring the temperature value TR within each test area with a corresponding one or more pixel of the plurality of sensor pixels, wherein the temperature set point is determined for each of the plurality of sensor pixels based on the measured temperature value TR for each test area of each layer.

5. The method of claim 1, wherein the absorption modifier is radiation absorber comprised within a fluid, and wherein the step (c) comprises depositing the amount of radiation absorber in the form of droplets using a droplet deposition head, and wherein for the repeating of step (c) the different amount is a larger amount of radiation absorber per unit area by depositing at least one of higher number of droplets per unit area, or droplets of a larger volume per unit area of radiation absorber; wherein at least one of the larger amounts of radiation absorbers is sufficient to cause the particulate material of the test region to start to melt.

6. The method of claim 1, wherein the absorption modifier is radiation absorber provided in the form of multiple different fluids comprising radiation absorber and deposited by respective droplet deposition heads, wherein the repeating of step (c) comprises, compared to the preceding layer:

(i) depositing each amount of radiation absorber as a multi-fluid pattern, wherein the different amount is a different multi-fluid pattern that causes the test region to absorb a higher amount of energy provided by the second heat source compared to the multi-fluid pattern deposited over the test region of the preceding layer; and/or (ii) depositing each radiation absorber in the form of a pattern, wherein for the further layer, the preceding fluid and the different fluid are deposited in respective patterns that are arranged to overlap to form a combined pattern by operating respective droplet deposition heads while passing them over the test region of the further layer, wherein the different amount is the combined pattern capable of absorbing an intermediate amount of energy of the radiation spectrum provided by the second heat source compared to the pattern deposited over the test area of the preceding layer and a new pattern comprising the different fluid deposited over the test are of a new layer subsequent to the further layer; and/or (iii) depositing a different radiation absorber for each further layer, wherein each radiation absorber comprises a different colour compared to the radiation absorber deposited for the preceding layer, and each different colour is capable of absorbing a larger amount of energy of the radiation spectrum provided by the second heat source compared to the colour of the preceding amount of radiation absorber; and/or (iv) depositing a higher number of droplets of fluid per unit area over the test region, wherein at least one of the different amounts of radiation absorber is deposited by operating the droplet deposition head while passing it over the test region of the further layer more than once.

7. The method of claim 1 wherein the absorption modifier is radiation absorber comprised within a fluid, and wherein the step (c) comprises depositing the amount of radiation absorber in the form of droplets using a droplet deposition head, wherein the step of depositing each different amount of radiation absorber, or each different radiation absorber, for each further layer comprises, compared to the radiation absorber deposited over the test area of the preceding layer:

(i) depositing a higher number of droplets of fluid per unit area over the test region; and/or (ii) depositing droplets of fluid of a larger volume per unit area over the test region; and/or (iii) depositing, by a respective further droplet deposition head, a different fluid, wherein the different fluid comprises:

a different radiation absorber capable of absorbing a higher amount of energy of the radiation spectrum provided by the second heat source than the preceding radiation absorber; and/or a higher concentration in weight per volume of the radiation absorber compared to that of the preceding fluid.

8. The method of claim 1, wherein the power input to the second heat source is substantially the same for each layer.

9. The method of claim 1, wherein the speed of passing the second heat source over the build bed surface is substantially constant.

10. The method of claim 1, comprising for each layer at least one of:

the power input to the second heat source is substantially constant;

the power input to the preheat heat source is substantially the same for each layer;

the speed of passing the second heat source over the build bed surface is substantially constant;

the speed of passing the preheat heat source over the build bed surface is substantially constant.

11. The method of claim 1, further comprising:

initiating the step of preheating with the preheat heat source after a third time interval from initiating the step of distributing the layer;

wherein the speed of passing the preheat heat source and the second heat source over each layer and the first, second and third time interval are constant throughout the calibrating of the thermal measurement scale of the thermal sensor; and wherein a subsequent object build process comprises the same layer cycle steps as the calibrating of the thermal measurement scale of the thermal sensor, wherein, for the object build process the step (b) comprises depositing absorption modifier in the form of radiation absorber over an object region; and step (c) comprises heating the object region over a period of time with the second heat source so as to cause the particulate material in the object region to melt; and repeating the layer cycle for the object build process until the object is complete;

wherein the speed of passing the preheat heat source and the second heat source over each layer and the first, second and third time interval are the same as for the calibrating of the thermal measurement scale of the thermal sensor.

12. The method of claim 1, wherein a subsequent object build process comprises the layer cycle steps of (a) distributing each layer, (b) preheating each layer, (c) depositing absorption modifier in the form of radiation absorber, (d) heating the layer, and subsequent temperature measurements at step (f), wherein the test region is an object region, wherein the steps of distributing, preheating and heating are carried out in the same direction, and wherein step (f) comprises measuring the temperature of the build bed surface using the thermal sensor having a temperature scale calibrated with the determined temperature set point.

* * * * *